United States Patent [19]

Althausen et al.

[11] 4,105,045

[45] Aug. 8, 1978

[54] DEVICE FOR MIXING LIQUID REACTION COMPONENTS

[75] Inventors: Ferdinand Althausen, Neunkirchen; Reiner Raffel, Siegburg, both of Germany

[73] Assignee: Maschinenfabrik Hennecke GmbH, Leverkusen, Germany

[21] Appl. No.: 646,217

[22] Filed: Jan. 2, 1976

[30] Foreign Application Priority Data

Jan. 16, 1975 [DE] Fed. Rep. of Germany ....... 2501483

[51] Int. Cl.² .............................................. B29B 1/04
[52] U.S. Cl. .............................................. 137/563
[58] Field of Search ........................................ 137/563

[56] References Cited

U.S. PATENT DOCUMENTS

| 3,122,164 | 2/1964 | Weinbrenner et al. | 137/563 |
| 3,784,169 | 1/1974 | Bockmann et al. | 137/563 X |
| 3,788,337 | 1/1974 | Breer | 137/563 X |
| 3,924,651 | 12/1975 | Hippel et al. | 137/563 X |

*Primary Examiner*—William R. Cline
*Attorney, Agent, or Firm*—Gene Harsh; Joseph C. Gil; William E. Parry

[57] ABSTRACT

The instant invention is directed to an improved device for mixing liquid reaction components comprising a storage container for each reaction component, a feed pipe leading from each container to a mixing head where the pipe terminates in a pressure controlled injecting jet, and a return pipe containing a shut-off valve, the improvement wherein a pressure adjustable initial stress valve is located in each return pipe. The adjusted initial stress pressure is greater than the solution pressure of the gases or air contained in the reaction components but less than the opening pressure of the injection jet.

2 Claims, 1 Drawing Figure

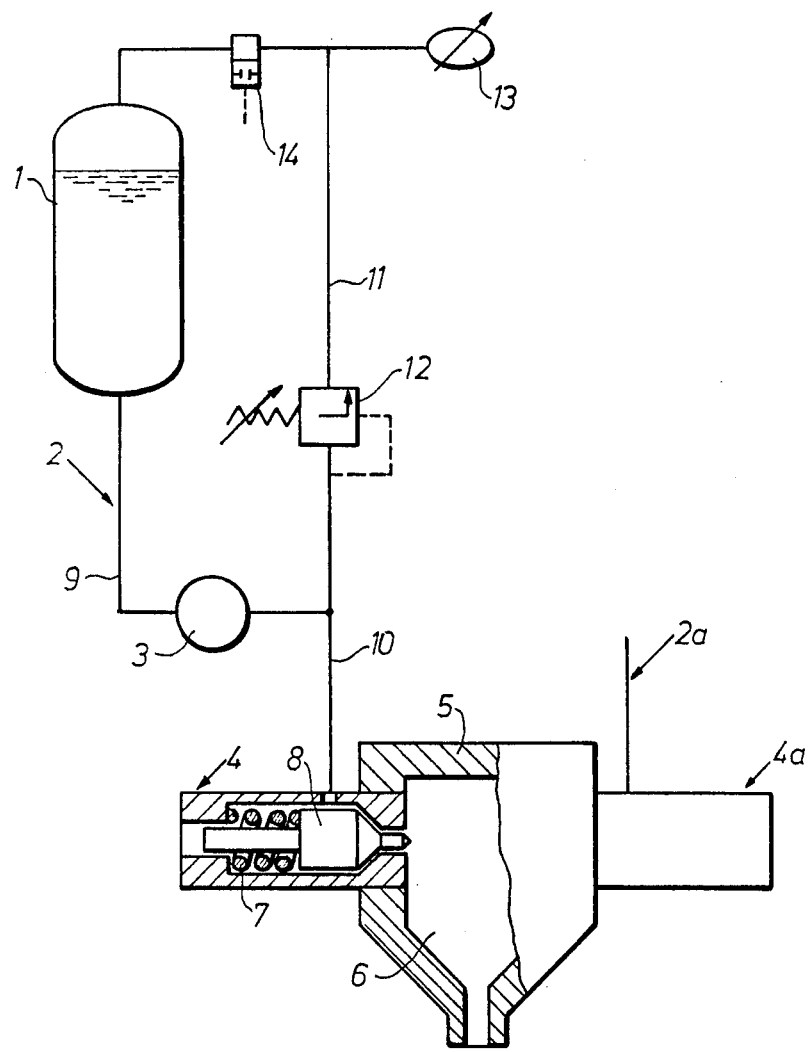

DEVICE FOR MIXING LIQUID REACTION COMPONENTS

BACKGROUND OF THE INVENTION

Devices for mixing liquid reaction components, which are used in the production of in-mold foamed objects, in particular those formed of a polyurethane are known in the art. These devices generally comprise a storage container for each reaction component, with one feed pipe leading from each storage container to a common mixing head where the pipe terminates in a pressure controlled injection jet, which points into a mixing chamber. In each case a return pipe containing a shut-off valve branches off from the pressure side section of the feed pipe, and opens out into the appropriate suction side section of the feed pipe.

The pipes of this type of device "breathe"; that is to say they expand under the pressure build-up of the reaction components. Since the reaction components contain gases and air in the form of small bubbles, such components have a certain compressibility, which has an effect on the opening intervals of the injection jets. If, because of the differences in compressibility of the components, one of the reaction components passes prematurely into the mixing chamber a part of the premature reaction component will pass unmixed through the exit opening of the mixing chamber into the interior of the mold. This creates undesirable defects in or on the foamed object. In spite of the problems inherent in the presence of these gas bubbles, the presence of gas or air in the reaction components is necessary, because upon expansion in the mixing chamber, the small bubbles form the seeds for the beginning of the foaming reaction.

An object of the present invention is therefore to provide a device which ensures the simultaneous entry of the reaction components, so that foam objects can be produced without defects.

DESCRIPTION OF THE DRAWING

The drawing shows one embodiment of the invention.

DESCRIPTION OF THE INVENTION

The problems outlined above are solved by arranging a pressure adjustable initial stress valve in each return pipe, wherein the adjusted initial stress pressure of each valve is greater than the solution pressure of the gases or air contained in the respective reaction component, but is below the adjusted opening pressure of the respective injection jet. The result of this is that during the pauses between mold filling operations, the gases carried in the liquids are maintained in solution and therefore the compressibility of the reaction component which causes the premature advancement, is avoided. In addition, the initial stress valve can even take over the function of the storage flask described in U.S. Pat. No. 3,122,164, the disclosure of which is herein incorporated by reference, for the regulation of the pressure build-up per time unit of the components to effect the simultaneous opening of the injection jets. The omission of this storage vessel is possible so long as the operating pressures lie between the solution pressure of the gases and the opening pressure of the injection jets.

Where the storage flask is omitted, the pressure adjustable initial stress valve should be located in the return pipe, upstream of the shut-off valve, since in this embodiment the initial stress valve must operate during the functioning of the mixing chamber.

The device of the instant invention and its operation is illustrated in greater detail below with reference to the drawing, in which an embodiment of the device according to the invention is shown schematically. The illustration only reproduces the piping system for one reaction component and the mixing head. The piping system for the second reaction component is constructed in a similar manner.

A storage container 1 contains one of the reaction components, e.g. a polyol. A feed pipe 2 incorporating a feed pump 3 leads from it, and opens out in an injection jet 4, which is located in a mixing head 5 and points into a mixing chamber 6. The injection jet 4 is provided with a spring 7 which acts as a jet needle 8. The jet 4 opens or closes at an adjusted pressure, e.g. at 150 bars. The feed pipe 2 comprises a suction side pipe section 9 located on the suction side of the feed pump 3, and a pressure side pipe section 10 extending between the feed pump 3 and the injection jet 4. A return pipe 11 leads back from the pipe section 10 to the storage container 1. An initial stress valve 12, a storage flask 13 and a shut-off valve 14 are located in the pipe 11. An isocyanate can be introduced into the mixing chamber 6 as a second reaction component through a second injection jet 4a and a feed pipe 2a. A suitable initial stress valve 12 is one such as that described in publication 2592 of November 1969, of Messrs. HAWE, Heilmeier & Weinlein, Munich, Federal Republic of Germany, the disclosure of which is herein incorporated by reference. These direct-loaded relief-jets are initial stress valves are kept closed in the direction of operation by means of spring-loaded ball (check) valves against the oil-pressure. When the working pressure exceeds the control value of the spring, the device opens, the tension of the coil being released to zero pressure. The opening pressure is adjustable by altering the initial stressing force of the spring.

The device operates as follows. The polyol is kept in storage container 1 under an initial pressure of 4 bars. When the feed pump 3 starts up, the polyol is sucked through the suction side pipe section 9 of feed pipe 2 and circulated, with the shut-off valve 14 open, through the return pipe 11. The initial stress valve 12 is adjusted, e.g. to 130 bars, so that gases and air in the polyol on the pressure side go into solution. After a brief start up time of a few seconds the pipe section 10 has adapted to the higher internal pressure. The shut-off valve 14 is then closed and the pressure build-up continues until the injection jet 4 opens at a pressure of 150 bars. The storage flask 13 is adjusted in a manner known in the art (see, e.g., U.S. Pat. No. 3,122,164) so that the injection jet 4a opens simultaneously with the opening of the injection jet 4. The shut-off valve 14 is coupled to a time relay (not shown) which is adjusted to keep the valve closed for a time period such that the proportional quantity of polyol required for filling the hollow space of the mold can flow into the mixing chamber 6 through the injection jet 4. At the end of this time period, the shut-off valve 14 opens, causing the injection jet 4 to close. The polyol is then again recycled through the return pipe 11 into the storage container 1. The adjusted pressure of the initial stress valve 12 ensures that gases contained in the polyol remain in solution in the pressure side pipe section 10. When next mold is to be filled, the shut-off valve 14 is closed again. The mode of working for the isocyanate side is analogous.

If the device is not provided with a storage flask 13, any reaction component which requires a shorter pressure build-up must be throttled by means of the initial stress valve 12 in order to ensure the synchronous opening of both injection jets. In this case the shut-off valve can advantageously be located upstream of the initial stress valve. The sequence of working in this embodiment is as follows: first the pumps 3 start up until the adjusted pressures are reached in the closed circuit through which the component is flowing. The pumps 3 continue so to operate for a short time until the pressures have stabilized. The shut-off valve 14 located in the return pipe 11 then closes and the pressure build-up is controlled by means of the adjusted pressure maintenance valve 12, so that both injection jets 8 open simultaneously. After the desired component quantities have passed through, the injection jets 8 close simultaneously with one another and with the shut-off valve 14. The components then again circulate in a closed circuit.

What is claimed is:

1. In a device for mixing liquid reaction components forming a foam after reaction comprising a storage container for each reaction component, a feed pipe leading from each storage container to a common mixing head where said pipe terminates in a pressure controlled injecting jet which points into a mixing chamber, and a return pipe containing a shut-off valve, said return pipe branching off from the pressure side section of each feed pipe, the return pipe opening out into the respective suction side section of the feed pipe, the improvement wherein a pressure adjustable initial stress valve whose adjusted initial stress pressure is greater than the solution pressure of the gases or air contained in the reaction components but less than the opening pressure of the injection jet is located in each return pipe.

2. A device according to claim 1, characterized in that the pressure adjustable initial stress valve in the return pipe is located upstream of the shut-off valve.

* * * * *